United States Patent [19]
Cannella

[11] 3,719,125
[45] March 6, 1973

[54] FORCE ADJUSTABLE ACTUATOR

[75] Inventor: Joseph L. Cannella, Melrose Park, Ill.

[73] Assignee: The Berg Manufacturing Company, Des Plaines, Ill.

[22] Filed: May 18, 1971

[21] Appl. No.: 144,543

[52] U.S. Cl.................................92/133, 92/63
[51] Int. Cl...............................................F01b 31/00
[58] Field of Search.............92/63, 64, 128, 130, 133

[56] References Cited

UNITED STATES PATENTS

| 3,254,662 | 6/1966 | Wagner | 92/133 |
| 3,187,642 | 6/1965 | Cruse | 92/63 |
| 3,439,585 | 4/1969 | Herrera | 92/63 |
| 3,424,062 | 1/1969 | Gummer et al | 92/63 |
| 3,026,081 | 3/1962 | Rossi | 92/133 |

*Primary Examiner*—Milton Kaufman
*Assistant Examiner*—Ronald H. Lazarus
*Attorney*—Parker, Carter & Markey

[57] ABSTRACT

A brake actuator including a brake-applying spring and means for adjusting the force of said spring throughout its excursion.

2 Claims, 1 Drawing Figure

PATENTED MAR 6 1973
3,719,125
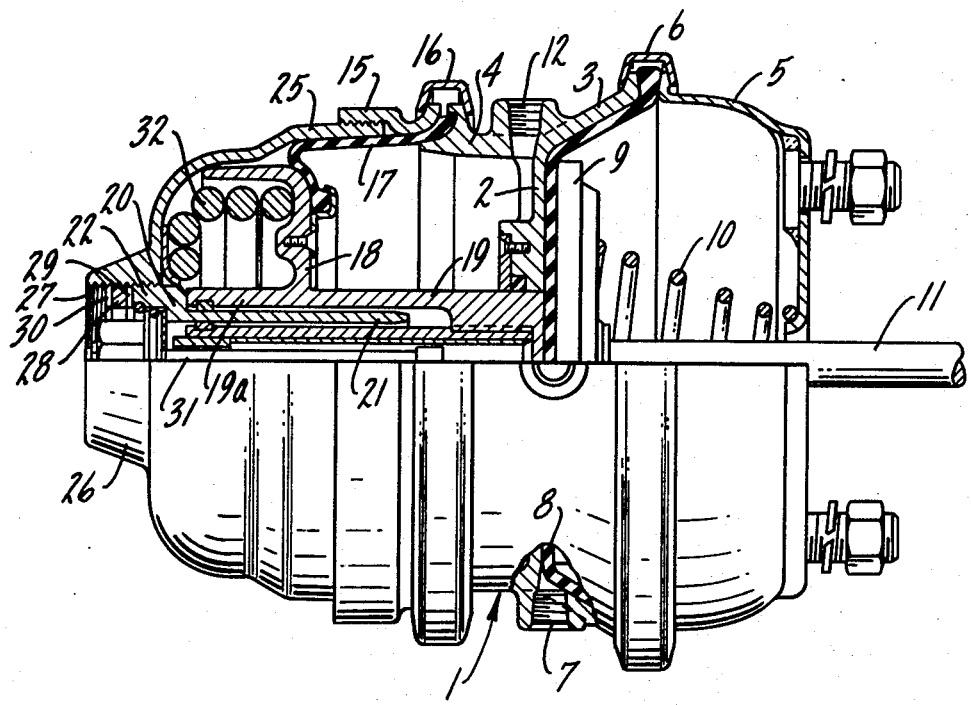
INVENTOR.
Joseph L. Cannella
BY Parker, Carter & Markey
Attorneys.

FORCE ADJUSTABLE ACTUATOR

SUMMARY OF THE INVENTION

This invention relates to brake actuators for motor vehicles and particularly to actuators employing spring forces for brake application.

Motor vehicles, particularly of the tractor-trailer type, have varying requirements for brake-applying forces. To meet such varying requirements with a variety of actuators and springs entails the manufacture and storage of numerous actuator and spring sizes, designs and models. It is accordingly one purpose of the invention to provide a standard actuator and spring which may be adjusted to meet such varying requirements.

Another purpose is to provide a brake actuator having a variable length housing.

Another purpose is to provide a brake actuator having a variable length housing and a variably positioned rear stop means for a brake-actuating element thereof.

Other purposes may appear from time to time during the course of the specification and claims.

BRIEF DESCRIPTION OF THE DISCLOSURE

The invention is illustrated more or less diagrammatically in the drawing wherein:

The FIGURE is a side elevation with parts in cross section.

Like parts are indicated by like numerals throughout the specification and drawing.

DESCRIPTION OF THE PREFERRED EMBODIMENT

Referring now to the drawing, the numeral 1 generally designates a brake housing. The housing 1 includes a central wall 2 having oppositely directed annular flanges 3,4. A dish-shaped member 5 is clamped to flange 3 by ring 6 to form a service chamber. The service chamber may be of the standard construction shown, having a service pressure inlet 7 positioned for delivery of fluid pressure to one side of wall 2 and to the opposed side of a diaphragm 8. A plate 9 engages the opposite side of diaphragm 8 under the urging of spring 10 and brake-actuating rod 11 is secured to plate 9 and extends from housing 1 for brake actuation. Inlet 12 is formed in member 2,3,4 for delivery of fluid pressure on the opposite side of wall 2.

An internally threaded adjustment ring 15 is clamped to flange 4 by ring 16, the ring 15 thus clamping to flange 4 one end of a flexible sleeve 17. The opposite end of sleeve 17 is clamped to a movable wall 18. An axial extension 19 is integral with wall 18 and extends forwardly thereof through the wall 2 for actuating engagement with diaphragm 8, plate 9 and rod 11. Extension 19 includes a rearwardly disposed portion 19a positioned for abutting contact with a guide member 20 when member 18 is at its rearmost position.

A dish-shaped housing part 25 has its forward open end externally threaded for engagement with the internal threads of ring 15. The rear wall portion of member 25 has an integral, rearwardly extending axial sleeve 26 internally threaded, as indicated at 27. An axially extending hollow sleeve 21 projects forwardly on member 20 to serve as a guide means for member 18,19. It will be observed that the member 20 has an externally threaded rear portion 22 formed and adapted for threaded engagement with the sleeve 26. A lock ring 28 is threadably received in the sleeve 26 to lock the member 20 in desired position. Indicated at 29 and 30 are rearwardly disposed tool-engaging recesses formed in the rear faces of members 20,28. A retraction means for wall member 18,19 is indicated generally at 31. Since the means 31 forms no part of the present invention, the same will not be further described.

A spring 32 has its forward coil engaging the rear surface of movable wall member 18 and its rearmost coil or coils engaging the inner surface of the rear wall portion of member 25.

The use and operation of the invention are as follows:

In normal brake operation fluid pressure is supplied at inlet 7 to move diaphragm 8 and members 9,11 in brake-applying direction. In such normal operation, the member 18 is quiescent, fluid pressure being supplied at inlet 12 to retain member 17,18,19 in the rearmost position shown in the drawing and to retain spring 32 in a compressed state as shown.

Should pressure be diminished or lost from the area between wall 2 and movable wall 18, the spring 32 is effective to move the member 17,18,19 and thus the diaphragm 8, plate 9 and rod 11 in brake-applying direction to apply the brakes.

The stroke of member 18,19 is determined by the distance between the member 18 and the opposed contacting surfaces of wall 2. Throughout said stroke, the force of spring 32 continuously diminishes at substantially a steady, constant rate. Hence the force at which the spring begins its excursion or expansion determines the brake-applying force available at any point in said stroke.

As the parts are shown in the drawing, spring 32 is provided with its maximum prestressing or maximum brake-applying forces. Should a lesser brake-applying force be desired, the operator merely rotates ring 15 and housing part 25 relative to each other to draw the member 25 outwardly of ring 15 and thus to lengthen the housing 1. The operator also employs relative rotation between member 20 and member 25 to retain the member 20 in a fixed position relative to housing wall 2 and thus to maintain the predetermined stroke of member 18. It will be understood that lock ring 28 is removed while member 20 is positioned and is replaced to retain the member 20 in its new position with respect to housing part 25. When the housing part 25 has been drawn outwardly, or to the left as the parts are shown in the drawing, and the actuator housing area containing member 18 and spring 32 is therefore lengthened, the spring 32 will be in an expanded position when member 18 is at its rearmost position shown. Hence the spring 32 will have a lower prestressing and a lower brake-applying force at the outset of its excursion and at each point throughout its excursion and throughout the stroke of member 18,19. The brake-applying forces of a single actuator structure may thus be varied to fit varying brake force requirements of a variety of vehicles for which the same actuator may thus be supplied.

The embodiments of the invention in which an exclusive property or privilege is claimed are defined as follows:

1. A brake actuator including a housing, a forward wall in said housing, a threaded ring element carried by said forward wall, a threaded, dish-shaped housing part threadably engaging said ring and extending rearwardly therefrom, said housing part having a rear wall portion opposed to and spaced from said forward wall, a movable wall member in said housing, a spring engaging said movable wall member and said rear wall portion of said housing part, said spring being positioned to urge said movable wall member toward said forward wall, the threaded connection between said ring element and dish-shaped housing part providing for adjustment of said housing part relative to said front wall and adjustment of the effective force of said spring in urging said movable wall member toward said front wall, a rear stop and excursion guide means for said movable wall, said last-named means comprising a threaded portion threadably engaging said rear wall portion of said housing part and positioned for contact by said movable wall member, to limit the rearward excursion thereof, said last-named threaded connection providing for adjustment of said stop and guide means relative to said rear wall portion, and an axial sleeve extending from said threaded portion into said housing for guiding contact with said movable wall member throughout its excursion.

2. The structure of claim 1 further characterized in that adjustment of said housing part relative to said front wall and adjustment of said stop and guide means relative to said rear wall portion provide for constant spacing between said rear wall portion and said movable wall and variable spacing between said movable wall and said front wall.

* * * * *